United States Patent
Mannarino et al.

(10) Patent No.: US 11,614,190 B2
(45) Date of Patent: Mar. 28, 2023

(54) SECONDARY UNLOCK TOOL FOR SUBSEA CONNECTORS

(71) Applicant: FMC Technologies, Inc., Houston, TX (US)

(72) Inventors: Marcos Cantu Mannarino, Rio de Janeiro (BR); Carlos Eduardo Castro Trevisani, Rio de Janeiro (BR); Daniel Lucas da Silva, Rio de Janeiro (BR); Alan Zaragoza Labes, Rio de Janeiro (BR)

(*) Notice: Subject to any disclaimer, the term of this patent is extended or adjusted under 35 U.S.C. 154(b) by 169 days.

(21) Appl. No.: 16/993,149

(22) Filed: Aug. 13, 2020

(65) Prior Publication Data

US 2022/0049803 A1 Feb. 17, 2022

(51) Int. Cl.
*F16L 37/00* (2006.01)
*E21B 33/038* (2006.01)
*F16L 37/62* (2006.01)

(52) U.S. Cl.
CPC .......... *F16L 37/002* (2013.01); *E21B 33/038* (2013.01); *F16L 37/62* (2013.01)

(58) Field of Classification Search
CPC ........ E21B 33/038; F16L 37/62; F16L 37/002
See application file for complete search history.

(56) References Cited

U.S. PATENT DOCUMENTS

| | | | | |
|---|---|---|---|---|
| 4,153,278 A | * | 5/1979 | Ahlstone | F16L 37/002 285/263 |
| 4,478,287 A | * | 10/1984 | Hynes | E21B 7/128 166/359 |
| 4,647,254 A | | 3/1987 | Baugh et al. | |
| 6,609,572 B1 | | 8/2003 | Andersen et al. | |
| 8,720,574 B2 | * | 5/2014 | Cuiper | E21B 33/038 285/308 |
| 10,415,339 B2 | * | 9/2019 | Garro | E21B 33/038 |
| 2019/0085650 A1 | | 3/2019 | Andueza | |
| 2019/0301249 A1 | * | 10/2019 | Kibler | E21B 23/02 |
| 2020/0056439 A1 | | 2/2020 | Andueza et al. | |

* cited by examiner

*Primary Examiner* — Aaron L Lembo
(74) *Attorney, Agent, or Firm* — Henry C. Query, Jr.

(57) ABSTRACT

A tool for mechanically unlocking a subsea hydraulic connector which is configured to releasably connect a first subsea component to a second subsea component. The connector includes a housing which is secured to the first subsea component, a locking piston which is positioned within the housing, and a number of locking jaws which are configured to be engaged by the locking piston. The locking piston is movable between a locked position in which the locking piston forces the locking jaws into engagement with the second subsea component to thereby secure the connector to the second subsea component, and an unlocked position in which the locking piston releases the locking jaws from engagement with the second subsea component to thereby disconnect the connector from the second subsea component. The tool includes a number of transportable actuators which are positionable into an operable position adjacent the connector, and activation of the actuators causes the locking piston to move from its locked position to its unlocked position to thereby disconnect the connector from the second subsea component.

19 Claims, 9 Drawing Sheets

SECONDARY UNLOCK TOOL FOR SUBSEA CONNECTORS

The present disclosure is directed to a tool for mechanically unlocking a subsea hydraulic connector whose primary hydraulic system has failed. More particularly, the disclosure is directed to a transportable tool which can be deployed to the connector and then activated to move the locking piston of the connector from the locked position to the unlocked position to thereby unlock the connector.

BACKGROUND OF THE DISCLOSURE

Subsea hydraulic connectors are commonly used in the subsea hydrocarbon production industry to remotely connect a variety of subsea components together end to end. For example, a subsea hydraulic connector may be used to connect a subsea Christmas tree to a wellhead housing which is installed at the upper end of a subsea well bore. In this application, the connector is usually secured to the bottom of the Christmas tree either at the factory or on a surface vessel from which the Christmas tree will be deployed. The Christmas tree, with the connector attached, is then lowered from the surface vessel until the connector lands on the wellhead housing, at which point the connector is activated to secure the connector, and thus the Christmas tree, to the wellhead housing. Subsea hydraulic connectors of this type are also used to connect subsea Christmas trees to tubing heads and to connect tubing heads to wellhead housings.

An example of a prior art subsea hydraulic connector is depicted in FIGS. 1A and 1B. The connector, generally 10, is shown being used to connect a subsea Christmas tree 12 to a wellhead housing 14 (only portions of which are shown). The connector 10 includes a cylindrical housing 16 which is secured to a top plate 18 that in turn is connected to the tree 12 by a split ring 20 to thereby secure the connector to the tree. A cylindrical locking piston 22 is positioned concentrically within the housing 16, and a plurality of locking jaws 24 are positioned concentrically within the locking piston.

The locking piston 22 includes a radially outwardly extending flange 26 which is sealed to the inner surface of the housing 16 by a pair of sealing elements 28. A radially outer surface of the locking piston 22 located above the flange 26 is sealed to the inner surface of the housing 16 by a pair of sealing elements 30, and a radially outer surface of the locking piston located below the flange is sealed to a retention ring 32 by a pair of sealing elements 34. The retention ring 32 is threaded into the lower end of the housing 16 and is sealed thereto by a pair of sealing elements 36. The sealing elements 28, 30 defined a first piston chamber 38 (see FIG. 1B) located between the flange 26 and an upper part of the housing 16. The sealing elements 28, 34, 36 defined a second piston chamber 40 located between the flange 26, the retention ring 32 and the lower part of the housing 16. The first and second piston chambers 38, 40 are connected to a source of hydraulic fluid (not shown) via first and second fluid passages 42, 44, respectively, which extend through the housing 16.

The locking jaws 24 include upper and lower end portions 46, 48. A first locking profile 50 is formed on a radially inner face of the upper end portion 46, and a second locking profile 52 is formed on a radially inner face of the lower end portion 48. The first locking profile 50 is configured to mate with a locking profile 54 formed on the outer surface of the tree 12, while the second locking profile 52 is configured to mate with a locking profile 56 formed on the outer surface of the wellhead housing 14.

In operation, once the connector 10 is landed on the wellhead housing 14, hydraulic fluid is conveyed through the first fluid passage 42 and into the first piston chamber 38 to move the locking piston 22 from the unlocked position shown in FIG. 1A to the locked position shown in FIG. 1B. During this action, the locking piston 22 forces the upper end portion 46 of the locking jaws 24 radially inwardly, which forces the first locking profile 50 into the locking profile 54 on the tree 12. Also, the locking piston 22 cams over the lower end portion 48 of the locking jaws 24 and forces the second locking profile 52 into the locking profile 56 on the wellhead housing 14 to thereby secure the connector 10, and thus the tree 12, to the wellhead housing.

In order to unlock the connector 10 from the wellhead housing 14, hydraulic fluid is conveyed through the second fluid passage 44 and into the second piston chamber 40 to move the locking piston 22 from the locked position shown in FIG. 1B to the unlocked position shown in FIG. 1A. This will allow the lower end portion 48 of the locking jaws 24 to expand radially outwardly away from the wellhead housing 14 and thereby unlock the connector 10, and thus the tree 12, from the wellhead housing.

In locking and unlocking the connector 10 from the wellhead housing 14, hydraulic fluid is typically communicated to the first and second fluid passages 42, 44 through a hydraulic umbilical extending from the surface vessel. If this umbilical is damaged or the hydraulic system supplying the connector 10 otherwise fails, the ability to convey hydraulic fluid to the first and second piston chambers 38, 40 can be lost. If this happens when the connector 10 is in the locked position, the locking piston 22 cannot be moved from the locked position to the unlocked position. As a result, the connector 10, and thus the tree 12, cannot be unlocked from the wellhead housing 14. Thus, a failure of the hydraulic system supplying the connector 10 will result in the inability to retrieve the tree 12 to the surface vessel, which will greatly inhibit the ability to repair the tree and conduct intervention operations on the subsea well.

Some prior art subsea hydraulic connectors are provided with a secondary unlock mechanism to move the locking piston from the locked position to the unlocked position in the event of a failure of the hydraulic system. In one example, the connector includes a number of release rods which are threaded into the top of the locking piston and extend through the top of the connector to a location which is accessible by a tool (which is lowered from the surface vessel or deployed by a remotely operated vehicle (ROV)) that engages the release rods and applies an upward force to move the locking piston from the locked position to the unlocked position. However, the release rods are a permanent part of the subsea connector and, thus, of the subsea component to which connector is mounted, and in the case of certain subsea components, such as subsea Christmas trees, the release rods must be long enough to extend to the top of the component in order to be accessible by the tool. As a result, the release rods can add considerably to the total weight of the subsea component, which in most subsea applications is undesirable.

SUMMARY OF THE DISCLOSURE

In accordance with the present disclosure, these and other limitations in the prior art are addressed by providing a tool for mechanically unlocking a subsea hydraulic connector which is configured to releasably connect a first subsea component to a second subsea component and comprises a housing which is secured to the first subsea component, a locking piston which is positioned within the housing, and a number of locking jaws which are configured to be engaged by the locking piston, wherein the locking piston is movable between a locked position in which the locking piston forces the locking jaws into engagement with the second subsea component to thereby secure the connector to the second subsea component, and an unlocked position in which the locking piston releases the locking jaws from engagement with the second subsea component to thereby disconnect the connector from the second subsea component. The tool comprises a number of transportable actuators which are positionable into an operable position adjacent the connector, wherein activation of the actuators causes the locking piston to move from its locked position to its unlocked position to thereby disconnect the connector from the second subsea component.

In accordance with one embodiment of the disclosure, each actuator comprises a stem which is configured to engage the locking piston and, upon activation of the actuator, moves the locking piston from its locked position to its unlocked position.

In accordance with another embodiment of the disclosure, each actuator comprises a hydraulic piston.

In accordance with a further embodiment of the disclosure, the tool comprises a frame on which the actuators are supported. In this embodiment, the frame may be configured to position the actuators in the operable position. For example, the frame may comprise first and second arms which are positionable on diametrically opposite sides of the connector adjacent an end of the locking piston.

In accordance with a yet another embodiment of the disclosure, the tool comprises means for anchoring the tool in position relative to the connector. For example, the anchoring means may comprise first and second channel members which are positioned on diametrically opposite sides of the connector and are each configured to receive a corresponding arm.

In accordance with another embodiment of the disclosure, the frame is configured to be transported by a remotely operated vehicle (ROV). In this embodiment, the actuators may be supplied with hydraulic fluid through the ROV. Also, the tool may comprise a hot stab receptacle which is mounted to the frame and is configured to be engaged by a hot stab from the ROV. In this manner, the hydraulic fluid may be communicated to the actuators through the hot stab and the hot stab receptacle.

The present disclosure is also directed to a tool for mechanically unlocking a subsea hydraulic connector which is configured to releasably connect a first subsea component to a second subsea component and comprises a housing which is secured to the first subsea component, a locking piston which is positioned within the housing, and a number of locking jaws which are configured to be engaged by the locking piston, wherein the locking piston is movable between a locked position in which the locking piston forces the locking jaws into engagement with the second subsea component to thereby secure the connector to the second subsea component, and an unlocked position in which the locking piston releases the locking jaws from engagement with the second subsea component to thereby disconnect the connector from the second subsea component. The tool comprises a transportable frame and a number of actuators which are mounted on the frame, wherein activation of the actuators moves the locking piston from its locked position to its unlocked position to thereby disconnect the connector from the second subsea component.

In accordance with one embodiment of the disclosure, each actuator comprises a stem which is configured to engage the locking piston and, upon activation of the actuator, moves the locking piston from its locked position to its unlocked position.

In accordance with another embodiment of the disclosure, each actuator comprises a hydraulic piston.

In accordance with yet another embodiment of the disclosure, the frame comprises first and second arms which are positionable on diametrically opposite sides of the connector adjacent an end of the locking piston.

In accordance with a further embodiment of the disclosure, the tool comprises means for anchoring the tool in position relative to the connector. For example, the anchoring means may comprise first and second channel members which are positioned on diametrically opposite sides of the connector and are each configured to receive a corresponding arm.

In accordance with another embodiment of the disclosure, the frame is configured to be transported by a remotely operated vehicle (ROV). In this embodiment, the actuators may be supplied with hydraulic fluid through the ROV. Also, the tool may comprise a hot stab receptacle which is mounted to the frame and is configured to be engaged by a hot stab from the ROV. In this manner, the hydraulic fluid may be communicated to the actuators through the hot stab and the hot stab receptacle.

The present disclosure is also directed to a method for unlocking a subsea hydraulic connector which is configured to releasably connect a first subsea component to a second subsea component and comprises a housing which is secured to the first subsea component, a locking piston which is positioned within the housing, and a number of locking jaws which are configured to be engaged by the locking piston, wherein the locking piston is movable between a locked position in which the locking piston forces the locking jaws into engagement with the second subsea component to thereby secure the connector to the second subsea component, and an unlocked position in which the locking piston releases the locking jaws from engagement with the second subsea component to thereby disconnect the connector from the second subsea component. The method comprises positioning a number of transportable actuators adjacent the locking piston; and activating the actuators to move the locking piston from its locked position to its unlocked position to thereby disconnect the connector from the second subsea component.

Thus, the secondary unlock tool of the present disclosure provides an effective means for unlocking a subsea hydraulic connector should the hydraulic system supplying the connector fail. In embodiments in which the tool can be transported by an ROV, the tool can be readily deployed and moved into its operable position adjacent the connector. This embodiment also enables the tool to be powered (i.e., supplied with hydraulic fluid in embodiments in which the actuators are hydraulic pistons) through an ROV hot stab. In this manner, the ROV, operating under the command of personnel on the surface vessel, can activate the tool and unlock the connector without further intervention using more complicated recovery tools. Furthermore, since the unlock tool is not a permanent part of the connector, it does not add to the total weight of the subsea component to which the connector is mounted.

These and other objects and advantages of the present disclosure will be made apparent from the following detailed description, with reference to the accompanying drawings. In the drawings, the same reference numbers may be used to denote similar components in the various embodiments.

DETAILED DESCRIPTION

Figure 1A:
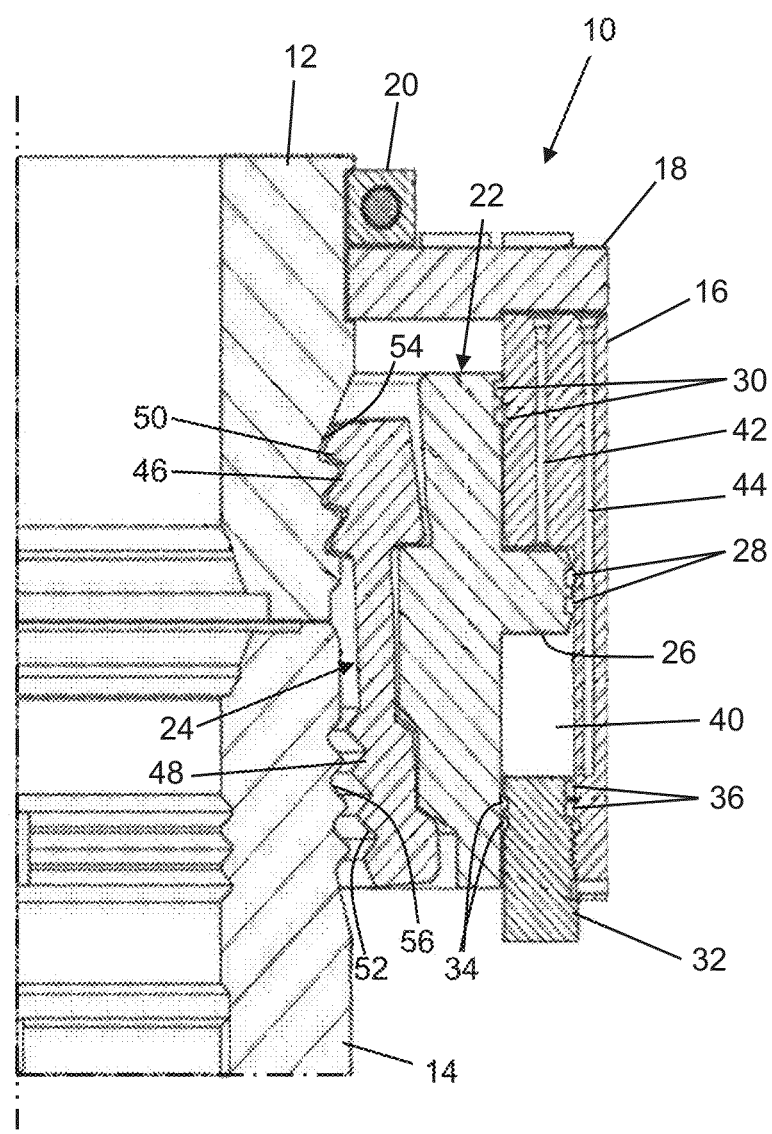
FIG. 1A is a cross sectional view of a prior art subsea hydraulic connector shown in the unlocked position.
Figure 1B:
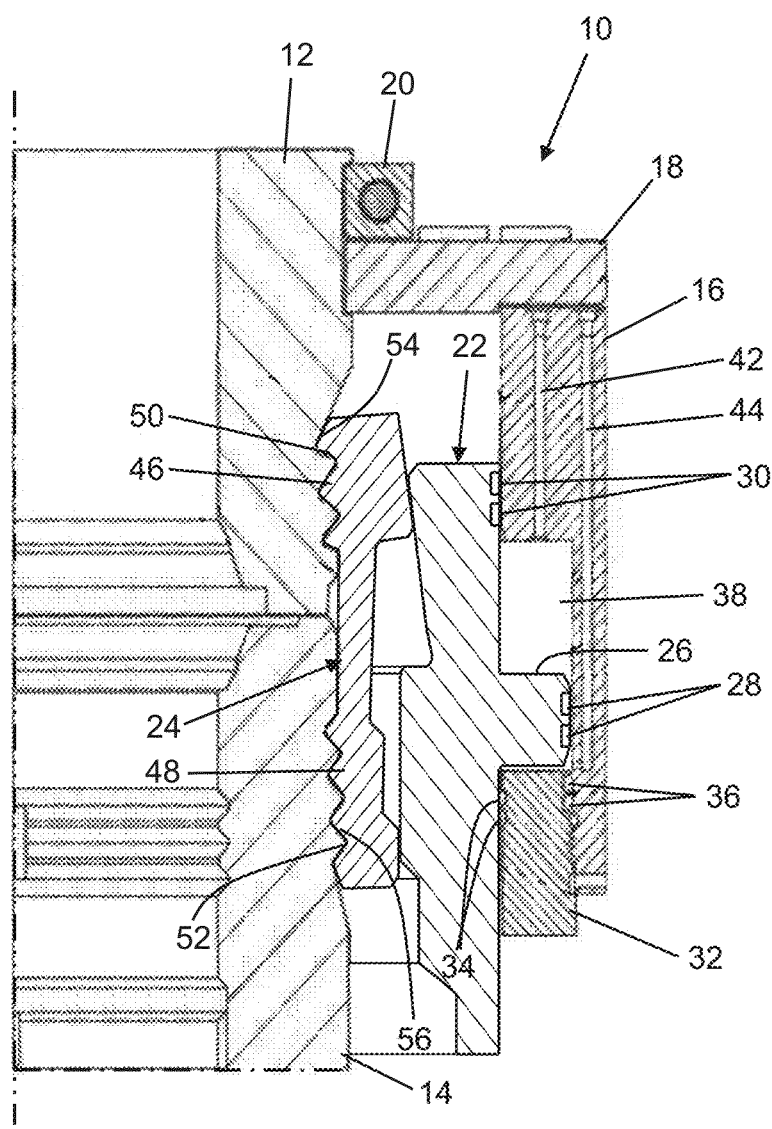
FIG. 1B is a cross section view of the hydraulic connector of FIG. 1A shown in the locked position.

For purposes of illustration, the secondary unlock tool of the present disclosure will be described in the context of the hydraulic connector 100 shown in FIGS. 2 and 3. The connector 100 includes a cylindrical housing 102 having an upper end which is connectable to a first subsea component, such as a subsea Christmas tree (not shown) and a lower end which in this example is connected to a guide frame 104 that functions to guide the connector into position for connection to a second subsea component, such as a wellhead housing (not shown). A plurality of locking jaws 106 are positioned concentrically within the housing 102. The locking jaws 106 are operably engaged by a cylindrical locking piston 108, which is retained in the housing 102 by a retention ring 110. Similar to the locking piston 22 described above in connection with the prior art subsea connector 10, the locking piston 108 comprises a radially outwardly extending flange 108a and is sealed to the housing 102 to thereby define, together with the housing, a first piston chamber 112 located above the flange (FIG. 2) and, together with the housing and the retention ring 110, a second piston chamber 114 located below the flange (FIG. 3). The connector 100 may also include a suitable gasket 116 for sealing between the first and second subsea components when the connector is in the locked position.

In operation, hydraulic fluid is conveyed into the first piston chamber 112 to force the locking piston 108 downward into the locked position, which in turn will force the locking jaws 106 radially inwardly into engagement with the second subsea component (e.g., a wellhead housing) to thereby secure the connector 100, and thus the first subsea component (e.g. a subsea Christmas tree), to the second subsea component. This is the locked position of the of the connector 100, which is shown in FIG. 2. In order to unlock the connector 100 from the second subsea component, hydraulic fluid is conveyed into the second piston chamber 114 to force the locking piston 108 upward into the unlocked position, which in turn will allow the locking jaws 106 to expand radially outwardly and thereby release the connector from the second subsea component. This is the unlocked position of the connector 100, which is shown in FIG. 3.

As discussed above, certain events may cause the hydraulic system supplying the hydraulic connector 100 to fail. If this happens, the ability to convey hydraulic fluid to the second piston chamber 114 is lost. As a result, if the failure occurs when the connector 100 is in the locked position, the locking piston 108 cannot be moved from the locked position to the unlocked position. Consequently, the connector 100, and thus the first subsea component, cannot be unlocked from the second subsea component. In the example where the first subsea component is a subsea Christmas tree and the second subsea component is a wellhead housing, a failure of the hydraulic system supplying the connector 100 will thus result in the inability to retrieve the Christmas tree to the surface vessel, which will greatly inhibit the ability to repair the Christmas tree and conduct intervention operations on the subsea well.

Figure 4:
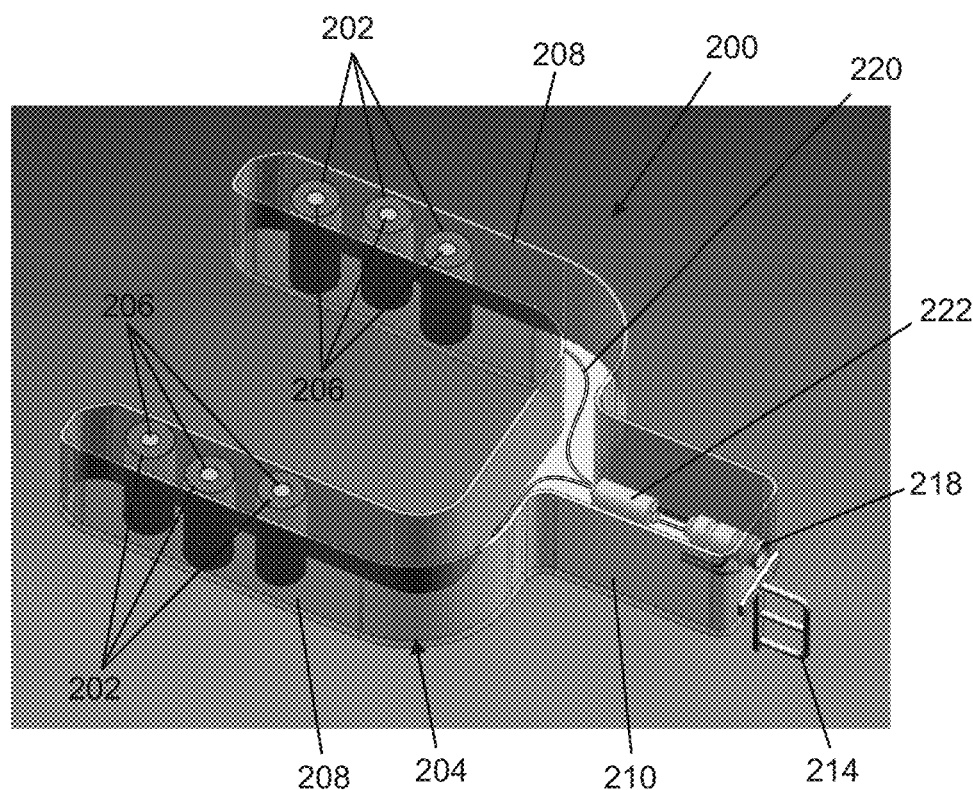
FIG. 4 is a top perspective view of an embodiment of the secondary unlock tool of the present disclosure with the actuator components of the tool shown in the non-activated condition.
Figure 5:
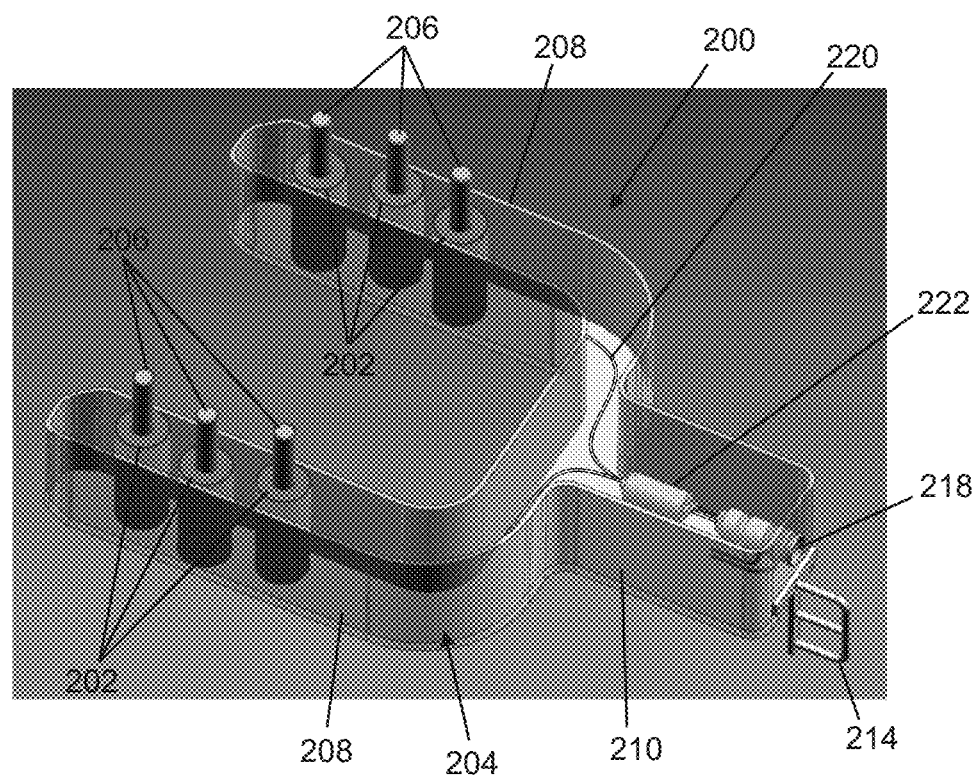
FIG. 5 is a top perspective view similar to FIG. 4 but with the actuator components of the tool shown in the activated condition.

The secondary unlock tool of the present disclosure eliminates the risks associated with a failure of the hydraulic system supplying the connector 100 by providing an independent means for moving the locking piston 108 from the locked position to the unlocked position. Referring to FIGS. 4 and 5, in accordance with one embodiment of the present disclosure the tool, generally 200, includes a number of actuators 202 which are supported on a frame 204. Each actuator 202 includes a stem 206 which is configured to engage the locking piston 108 either directly or via a suitable mechanical linkage (not shown). In the present embodiment, for example, each stem 206 comprises a generally flat distal end which is configured to engage the bottom of the locking piston 108.

Figure 6:
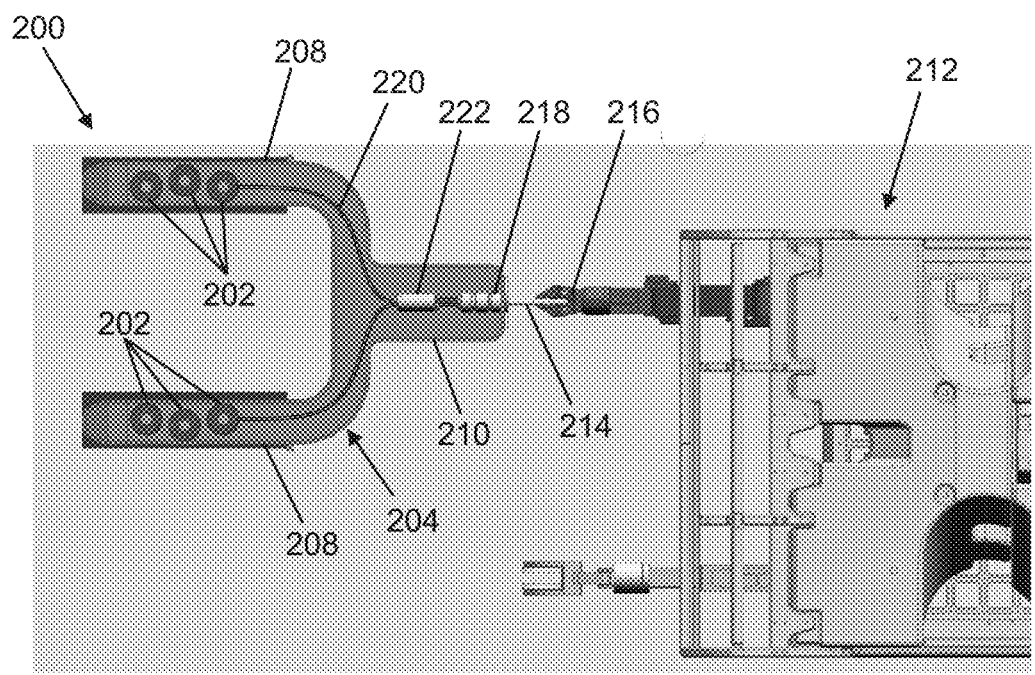
FIG. 6 is a top elevation view of the secondary unlock tool of FIG. 4 shown being deployed by an ROV.

The tool 200 may be a distinct device which is deployed when the hydraulic system supplying the connector 100 fails to unlock the connector from the second subsea component. In this embodiment, which is the embodiment shown in the drawings, the frame 204 is configured to position the actuators 202 adjacent the bottom of the locking piston 108. For example, the frame 204 may comprise a pair of first and second arms 208 which are sized and spaced so as to be positioned on diametrically opposite sides of the guide frame 104 during use of the tool 200. The arms 208 may be connected to or formed integrally with a shank 210 which is configured to be engaged by a separate device that is used to transport, position and possibly also actuate the tool 200. In one embodiment, which is shown in FIG. 6, the tool 200 is of a size and weight to enable it to be deployed by an ROV 212. In this case, the distal end of the shank 210 may be provided with a handle 214 which can be gripped by a manipulator arm 216 of the ROV 212. Notwithstanding the above, it should be understood that the frame 204 can have any configuration which will enable at least one actuator 202 (or the minimum number of actuators which are sufficient for a particular application) to be positioned adjacent the bottom of the locking piston 108.

In the embodiment of the disclosure shown in the drawings, the tool 200 includes six actuators 202, three on each arm 208 of the frame 204. However, the number of actuators may vary from one to six or more, depending on the particular application in which the tool 200 is intended to be used. Also, when the tool 200 includes a plurality of actuators 202, the actuators are preferably arranged along the arcs of a circle which coincides with the shape of the locking piston 108.

Each actuator 202 is a powered device which is operable to extend, and preferably also retract, the stem 206. In one embodiment, each actuator 202 comprises a hydraulic piston which is powered by hydraulic fluid supplied from a suitable source. For example, each actuator 202 may be supplied with hydraulic fluid through the ROV 212, which may include an on-board supply of hydraulic fluid or be connected to a separate source of hydraulic fluid (located, e.g., on a surface vessel) via a hydraulic umbilical (not shown). Alternatively, the actuators 202 may be supplied directly with hydraulic fluid from a separate source of hydraulic fluid (located, e.g., on the surface vessel) which is connected to the tool 200 via a hydraulic umbilical (not shown). In yet another alternative, the tool 200 may comprise on-board source of hydraulic fluid for the actuators 202.

The tool 200 may be connected to the source of hydraulic fluid through a connector 218. In the event the tool receives 200 the hydraulic fluid from the ROV 212, the connector 218 may comprise a hot stab receptacle which is configured to receive the hydraulic fluid through a hot stab from the ROV (not shown). From the connector 218, the hydraulic fluid is conveyed to the actuators 202 through hydraulic lines 220. The lines 220 may be routed through an optional flow divider 222 to direct the hydraulic fluid to the actuators 202 located in the separate arms 208.

As an alternative to hydraulic pistons, each actuator 202 may comprise an electrically-powered device, such as a solenoid actuator, which is provided with electrical power through the ROV or an umbilical from the surface vessel. In yet another alternative, some of the actuators 202 may comprise hydraulic pistons and some may comprise electrically-powered devices, such as solenoid actuators.

Figure 7:
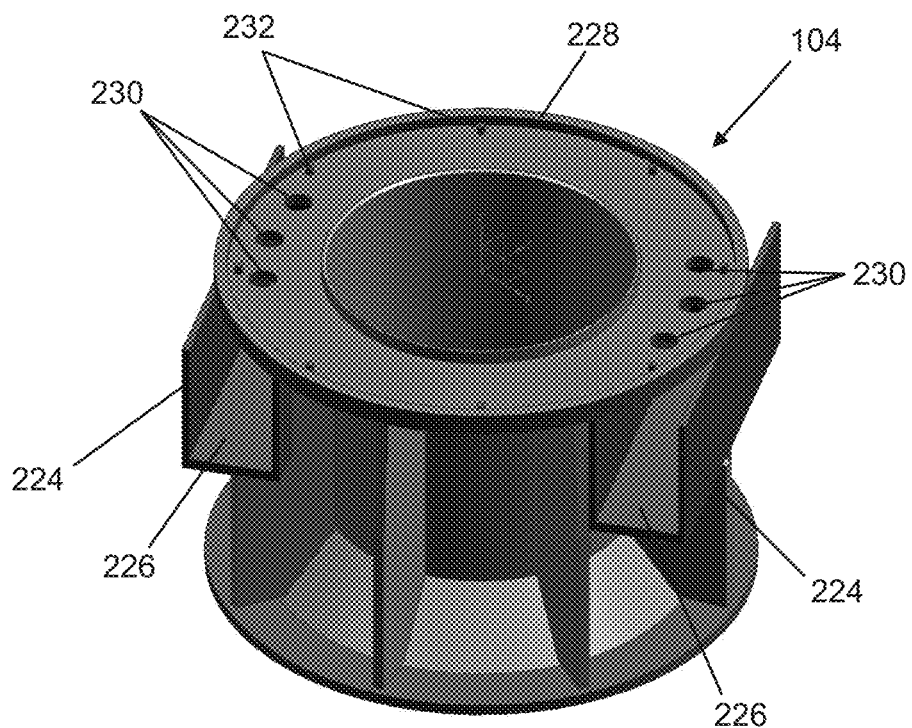
FIG. 7 is a perspective view of the guide frame component of the subsea hydraulic connector shown in FIGS. 2 and 3.

During operation of the actuators 202 to move the locking piston 108 from the locked position to the unlocked position, the stems 206 will react against the locking piston and generate an opposite force on the tool 200. Therefore, means are ideally provided to anchor the tool 200 in position relative to the connector 100. Referring to FIG. 7, for example, the guide frame 104 to which the connector 100 is secured may be provided with two channel members 224 which are mounted on diametrically opposite sides of the guide frame. Each channel member 224 defines an opening 226 which is configured to receive a corresponding arm 202 of the tool 200. In a preferred embodiment, the channel members 224 are oriented to enable the arms to slide into the openings 226 when the tool 200 is guided into its operable position below the connector 100.

FIG. 7 also illustrates that the guide frame 104 may include a top plate 228 which comprises a number of holes 230 through which the stems 206 extend when the tool 200 is in its operable position and the actuators 202 are activated to move the locking piston 108 from its locked position to its unlocked position. The top plate 228 may be secured to the housing 102 with bolts 232, which may be threaded directly into the bottom of the housing or, alternatively, into the retention ring 110 (which itself is secured to the housing).

Figure 9:
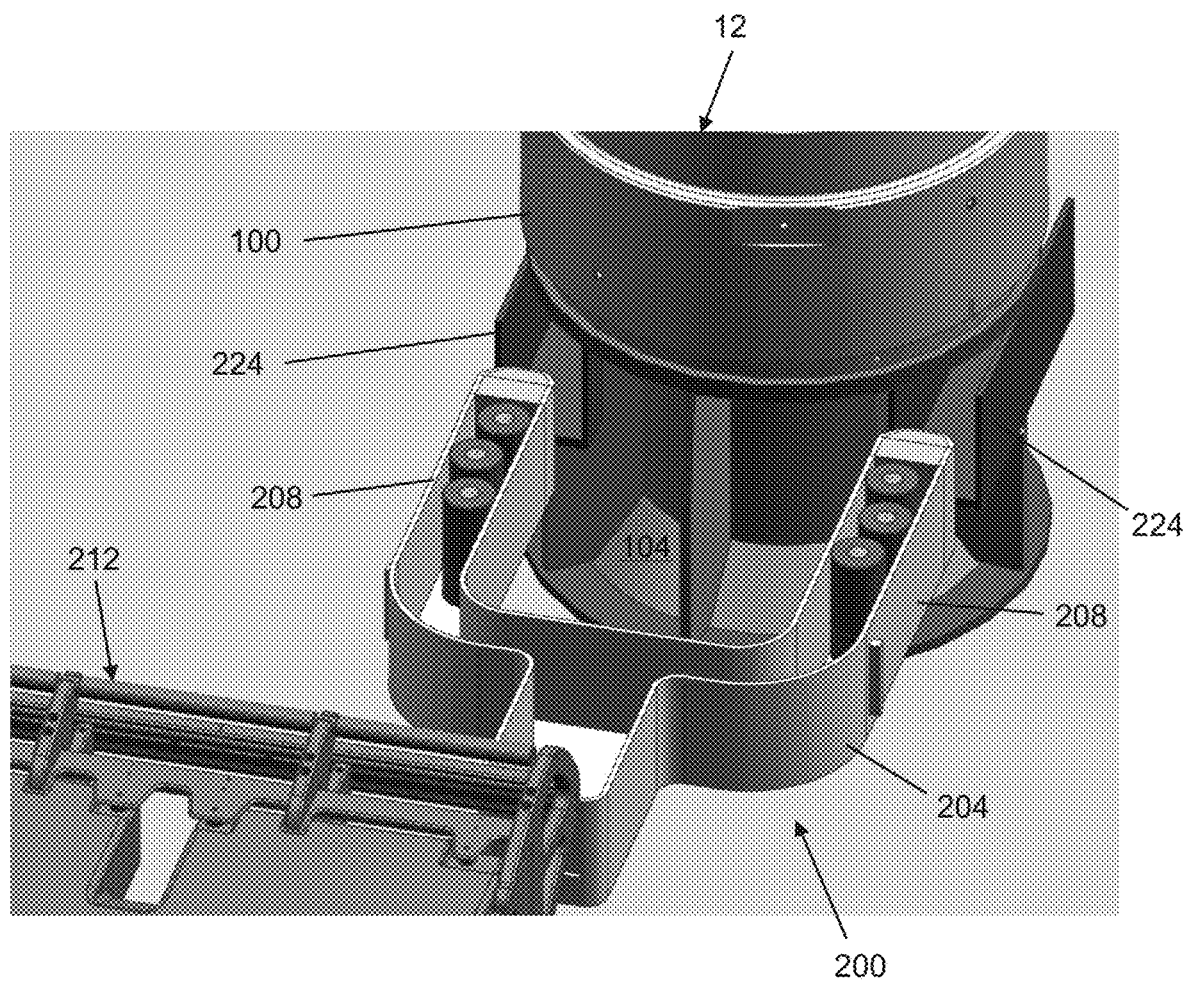
FIG. 9 is an enlarged top perspective view of the secondary unlock tool being guided by the ROV into its operable position with respect to the subsea Christmas tree.
Figure 10:
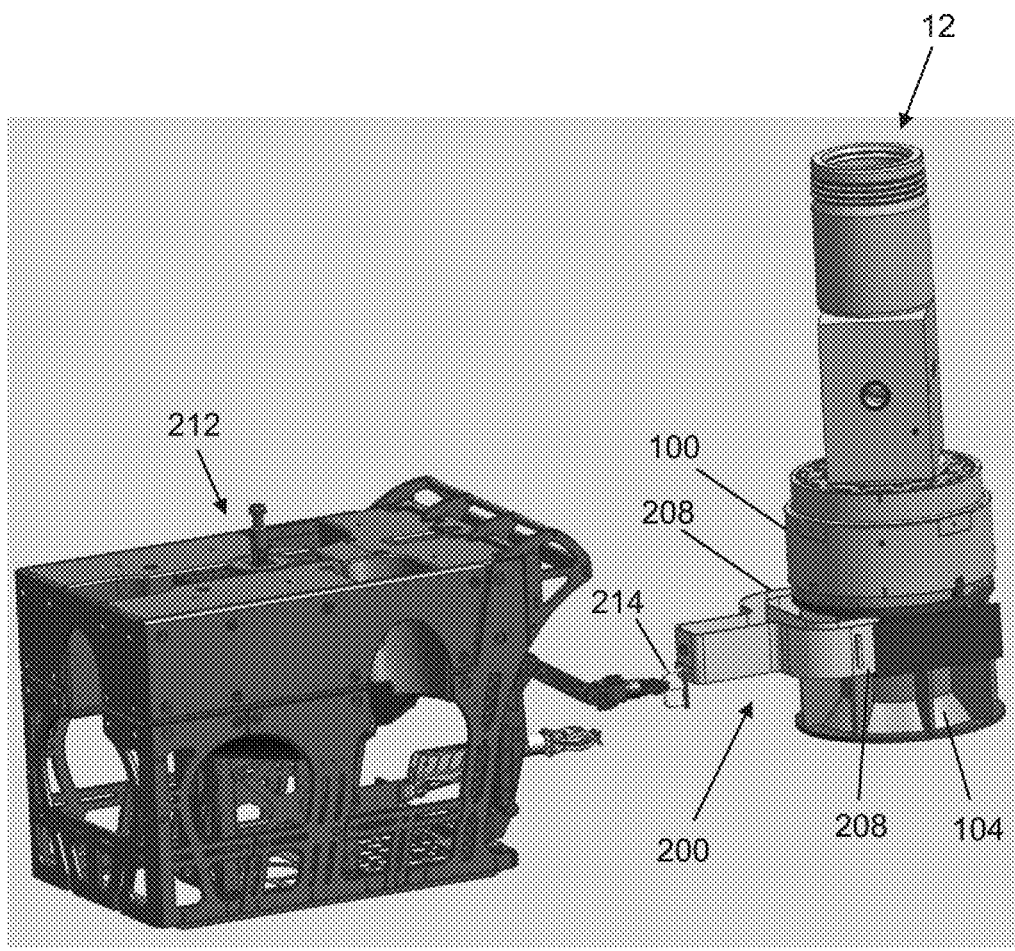
FIG. 10 is a front perspective view of the secondary unlock tool in its operable position on the subsea Christmas tree.

Operation of the tool 200 will now be described with reference to FIGS. 8-10, which depict the tool being transported by an ROV 212 to its operable position adjacent a connector 100 which is secured to the bottom of a subsea Christmas tree 12. For purposes of clarity, the subsea component to which the tree 12 is being connected (e.g., a wellhead housing) has been omitted from FIGS. 8-10.

Figure 8:
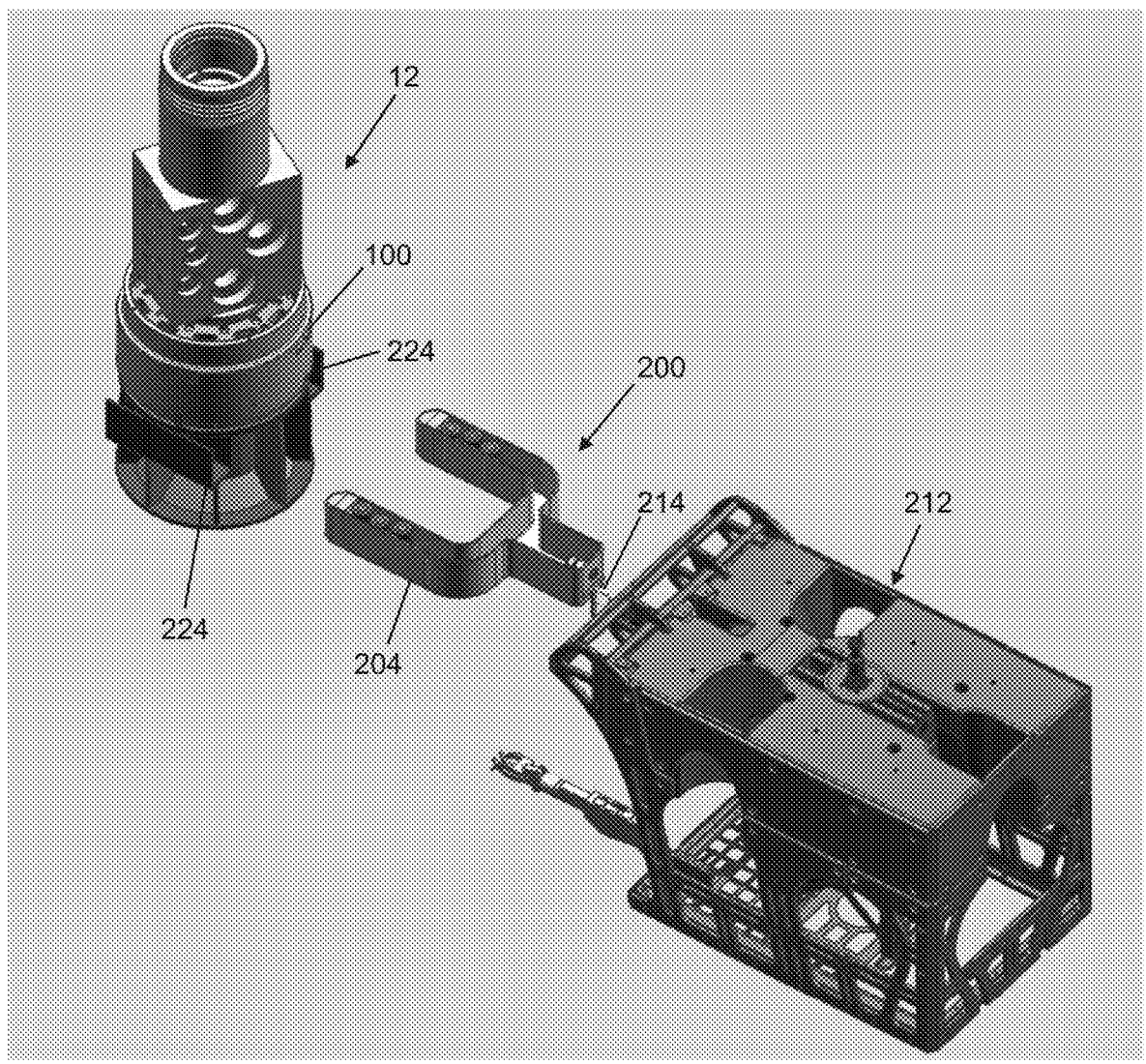
FIG. 8 is a top perspective view of the secondary unlock tool of FIG. 4 shown being deployed by an ROV to an illustrative subsea Christmas tree, most of whose components have been removed for clarity.

As shown in FIG. 8, the ROV 212 has gripped the handle 214 on the end of the frame 204 and is guiding the tool 200 toward the connector 100. As the tool 200 approaches the connector 100, the ROV 212 aligns the arms 208 of the frame 204 with the channel members 224 (FIG. 9). The ROV 212 then advances the tool 200 toward the connector 100 until the arms 208 enter the channel members 224, at which point the ROV pushes the tool into the channel members until the tool reaches is operable position, as shown in FIG. 10. In this regard, the operable position of the tool 200 may coincide with the position in which the portion of the frame 204 connecting the arms 208 abuts against the guide frame 104.

Figure 2:
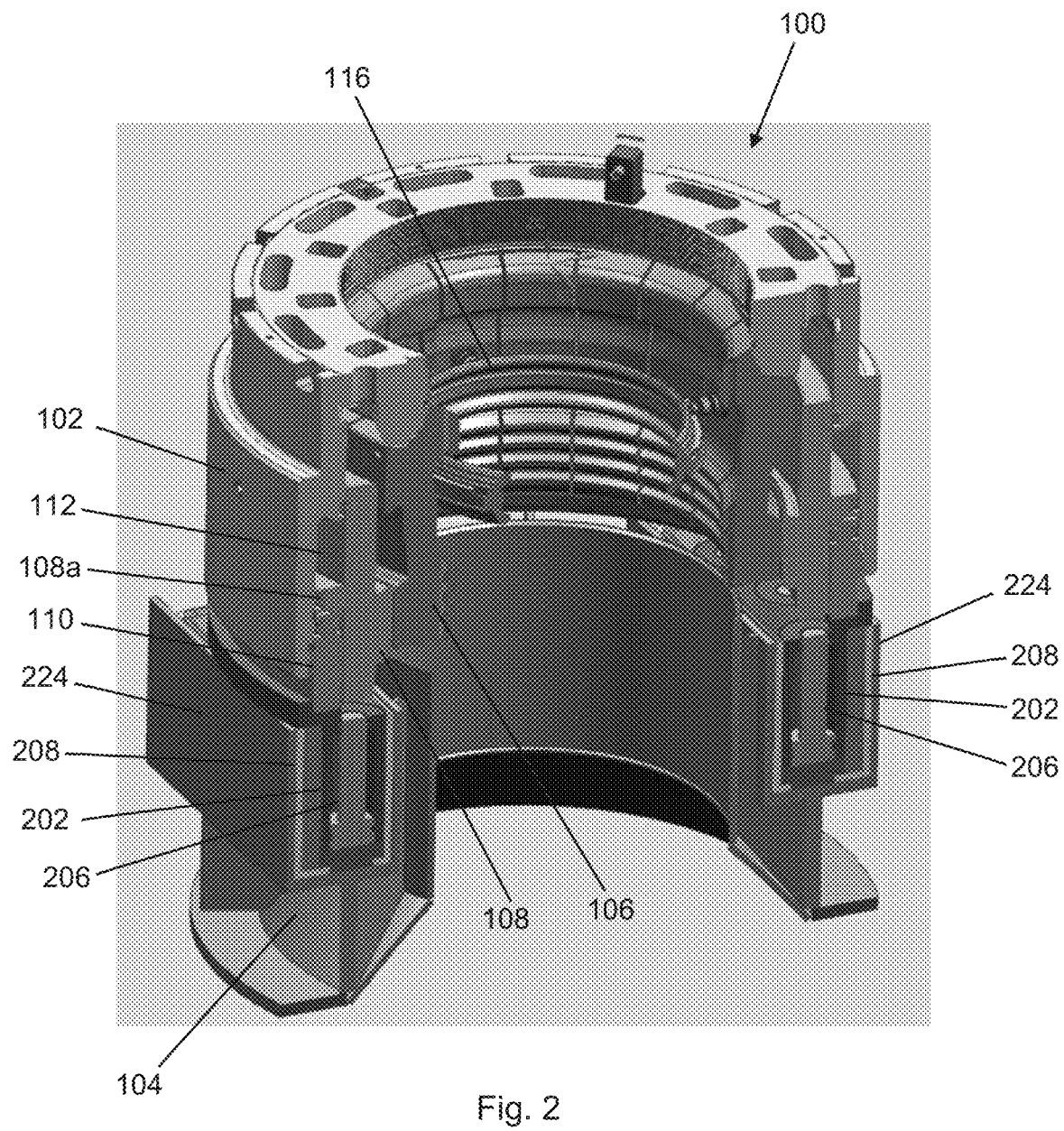
FIG. 2 is a cross sectional perspective view of an illustrative subsea hydraulic connector shown in conjunction with an embodiment of the secondary unlock tool of the present disclosure, with the connector shown in the locked position.
Figure 3:
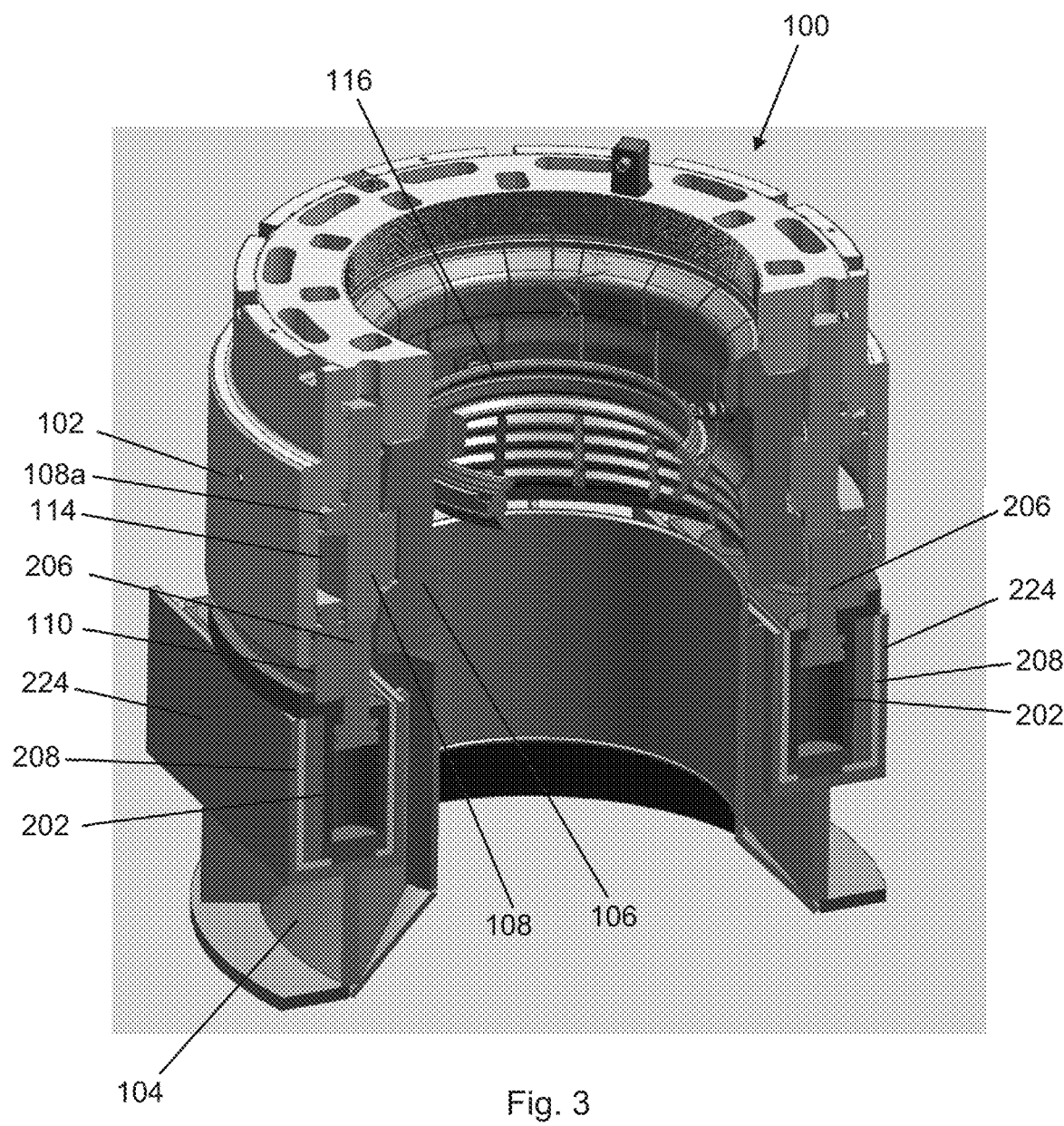
FIG. 3 is a cross sectional perspective view similar to FIG. 2 but with the connector shown in the unlocked position.

With the tool 200 in its operable position relative to the connector 100, the actuators 202 are positioned below the locking piston 108, as shown in FIG. 2. The actuators 202 may then be activated in a conventional manner to extend the stems 206. Due to their proximity to the locking piston 108, as the stems 206 are extended, they will engage the bottom of the locking piston and move the locking piston from its locked position to its unlocked position, as shown in FIG. 3. This will disconnect the connector 100, and thus the tree 12, from the second subsea component (e.g., a subsea wellhead). Once disconnected, the tree 12 may be retrieved to the surface vessel.

Thus, the secondary unlock tool 200 of the present disclosure provides a simple, easy to deploy means for unlocking the connector 100 should the hydraulic system supplying the connector fail. In embodiments in which the tool 200 can be transported by an ROV, the tool can be readily deployed and moved into its operable position adjacent the connector 100. This embodiment also enables the tool to be powered (i.e., supplied with hydraulic fluid in embodiments in which the actuators 202 are hydraulic pistons) through an ROV hot stab. In this manner, the ROV, operating under the command of personnel on the surface vessel, can activate the tool 200 and unlock the connector without further intervention using more complicated recovery tools.

It should be recognized that, while the present disclosure has been presented with reference to certain embodiments, those skilled in the art may develop a wide variation of structural and operational details without departing from the principles of the disclosure. For example, the various elements shown in the different embodiments may be combined in a manner not illustrated above. Therefore, the following claims are to be construed to cover all equivalents falling within the true scope and spirit of the disclosure.

What is claimed is:

1. A tool for mechanically unlocking a subsea hydraulic connector which is configured to releasably connect a first subsea component to a second subsea component, the connector comprising a housing which is secured to the first subsea component, a locking piston which is positioned within the housing, and a number of locking jaws which are configured to be engaged by the locking piston, the locking piston being movable between a locked position in which the locking piston forces the locking jaws into engagement with the second subsea component to thereby secure the connector to the second subsea component, and an unlocked position in which the locking piston releases the locking jaws from engagement with the second subsea component to thereby disconnect the connector from the second subsea component, the tool comprising:
- a number of transportable actuators which are positionable into an operable position adjacent the connector;
- wherein activation of the actuators causes the locking piston to move from its locked position to its unlocked position to thereby disconnect the connector from the second subsea component;
- wherein each actuator comprises a stem which is configured to engage the locking piston and, upon activation of the actuator, move the locking piston from its locked position to its unlocked position; and
- wherein the tool further comprises a frame on which the actuators are supported.

2. The tool of claim 1, wherein each actuator comprises a hydraulic piston.

3. The tool of claim 1, wherein the frame is configured to position the actuators in the operable position.

4. The tool of claim 3, wherein the frame comprises first and second arms which are positionable on diametrically opposite sides of the connector adjacent an end of the locking piston.

5. The tool of claim 4, further comprising means for anchoring the tool in position relative to the connector.

6. The tool of claim 5, wherein the anchoring means comprises first and second channel members which are positioned on diametrically opposite sides of the connector, each channel member being configured to receive a corresponding arm.

7. The tool of claim 1, wherein the frame is configured to be transported by a remotely operated vehicle (ROV).

8. The tool of claim 7, wherein the actuators are supplied with hydraulic fluid through the ROV.

9. The tool of claim 8, further comprising a hot stab receptacle which is mounted to the frame and is configured to be engaged by a hot stab from the ROV, wherein the hydraulic fluid is communicated to the actuators through the hot stab and the hot stab receptacle.

10. A tool for mechanically unlocking a subsea hydraulic connector which is configured to releasably connect a first subsea component to a second subsea component, the connector comprising a housing which is secured to the first subsea component, a locking piston which is positioned within the housing, and a number of locking jaws which are configured to be engaged by the locking piston, the locking piston being movable between a locked position in which the locking piston forces the locking jaws into engagement with the second subsea component to thereby secure the connector to the second subsea component, and an unlocked position in which the locking piston releases the locking jaws from engagement with the second subsea component to thereby disconnect the connector from the second subsea component, the tool comprising:
- a transportable frame; and
- a number of actuators which are mounted on the frame;
- wherein activation of the actuators moves the locking piston from its locked position to its unlocked position to thereby disconnect the connector from the second subsea component.

11. The tool of claim 10, wherein each actuator comprises a stem which is configured to engage the locking piston and upon activation of the actuator moves the locking piston from its locked position to its unlocked position.

12. The tool of claim 11, wherein each actuator comprises a hydraulic piston.

13. The tool of claim 11 or 12, wherein the frame comprises first and second arms which are positionable on diametrically opposite sides of the connector adjacent an end of the locking piston.

14. The tool of claim 13, further comprising means for anchoring the tool in position relative to the connector.

15. The tool of claim 14, wherein the anchoring means comprises first and second channel members which are positioned on diametrically opposite sides of the connector, each channel member being configured to receive a corresponding arm.

16. The tool of claim 11 or 12, wherein the frame is configured to be transported by a remotely operated vehicle (ROV).

17. The tool of claim 16, wherein the actuators are supplied with hydraulic fluid through the ROV.

18. The tool of claim 17, further comprising a hot stab receptacle which is mounted to the frame and is configured to be engaged by a hot stab from the ROV, wherein the hydraulic fluid is communicated to the actuators through the hot stab and the hot stab receptacle.

19. A method for unlocking a subsea hydraulic connector which is configured to releasably connect a first subsea component to a second subsea component, the connector comprising a housing which is secured to the first subsea component, a locking piston which is positioned within the housing, and a number of locking jaws which are configured to be engaged by the locking piston, the locking piston being movable between a locked position in which the locking piston forces the locking jaws into engagement with the second subsea component to thereby secure the connector to the second subsea component, and an unlocked position in which the locking piston releases the locking jaws from engagement with the second subsea component to thereby disconnect the connector from the second subsea component, the method comprising:
- positioning a number of transportable actuators adjacent the locking piston; and
- activating the actuators to move the locking piston from its locked position to its unlocked position to thereby disconnect the connector from the second subsea component;
- wherein each actuator comprises a stem which is configured to engage the locking piston and, upon activation of the actuator, move the locking piston from its locked position to its unlocked position; and
- wherein the actuators are supported on a frame.

* * * * *